(12) United States Patent  
Andrén et al.

(10) Patent No.: US 6,588,693 B2
(45) Date of Patent: Jul. 8, 2003

(54) FISHING REEL

(75) Inventors: Lars Andrén, Sjövik (SE); Folke Östling, Göteborg (SE); Maurice Richard, Thomery (FR); Patrik Svensson, Asarum (SE)

(73) Assignees: Aktiebolaget SKF, Göteborg (SE); Pure Fishing Inc., Svängsta (SE)

( * ) Notice: Subject to any disclaimer, the term of this patent is extended or adjusted under 35 U.S.C. 154(b) by 0 days.

(21) Appl. No.: 10/060,361

(22) Filed: Feb. 1, 2002

(65) Prior Publication Data

US 2002/0113156 A1 Aug. 22, 2002

(30) Foreign Application Priority Data

Feb. 1, 2001 (SE) ................................. 0100316

(51) Int. Cl.$^7$ ..................... A01K 89/00; A01K 89/01; A01K 89/015
(52) U.S. Cl. ..................... 242/322; 242/321; 242/319
(58) Field of Search ................. 242/322, 321, 242/319, 318, 317

(56) References Cited

U.S. PATENT DOCUMENTS

| 2,180,566 | A | * | 11/1939 | Thompson | 242/295 |
|---|---|---|---|---|---|
| 2,257,023 | A | * | 9/1941 | Ray | 242/258 |
| 2,344,209 | A | * | 3/1944 | Lowe | 242/246 |
| 3,186,656 | A | * | 6/1965 | Venable | 242/321 |
| 4,771,964 | A | * | 9/1988 | Watanabe et al. | 242/250 |
| 4,911,378 | A | * | 3/1990 | Hitomi | 242/246 |
| 5,207,396 | A | * | 5/1993 | Furomoto | 242/321 |
| 5,626,303 | A | * | 5/1997 | Bringsen | 242/265 |
| 5,875,986 | A | * | 3/1999 | Miyazaki et al. | 242/261 |
| 6,286,772 | B1 | * | 9/2001 | Koelewyn | 242/246 |
| 6,382,544 | B1 | * | 5/2002 | Park | 242/303 |
| 6,511,007 | B1 | * | 1/2003 | Matsuura | 242/290 |
| 6,513,743 | B1 | * | 2/2003 | Perkins et al. | 242/295 |

* cited by examiner

Primary Examiner—Emmanuel Marcelo
(74) Attorney, Agent, or Firm—Burns, Doane, Swecker & Mathis, LLP

(57) ABSTRACT

A fishing reel includes a spool rotatably supported in a bearing arrangement on a spindle unit. The spindle unit is a held-together unit incorporating an elongated spindle and a bearing housing supported on the spindle by at least two spaced apart rolling bearings. Annular end washers on the spindle shield off the interior of the housing from the surrounding environment via a small slot acting as a seal. The housing has at least one exterior radially extending shoulder and the spool has at least one internal projection intended to engage the shoulder of the housing to define the axial position of the spool relative to the bearings while also taking up axial load in one direction. A resilient member between the bearing housing and the spool gives play-free contact between the housing and the spool and gives a pretension of the spindle unit against the shoulder of the housing.

18 Claims, 3 Drawing Sheets

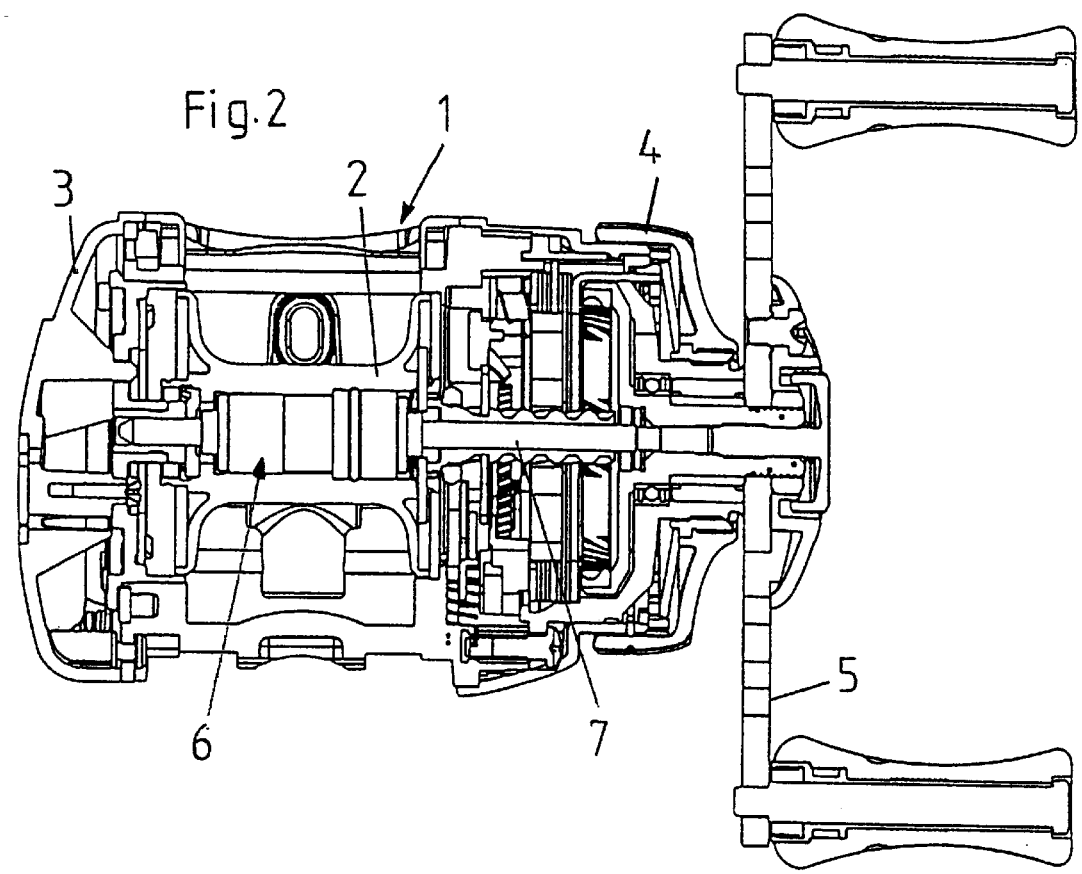
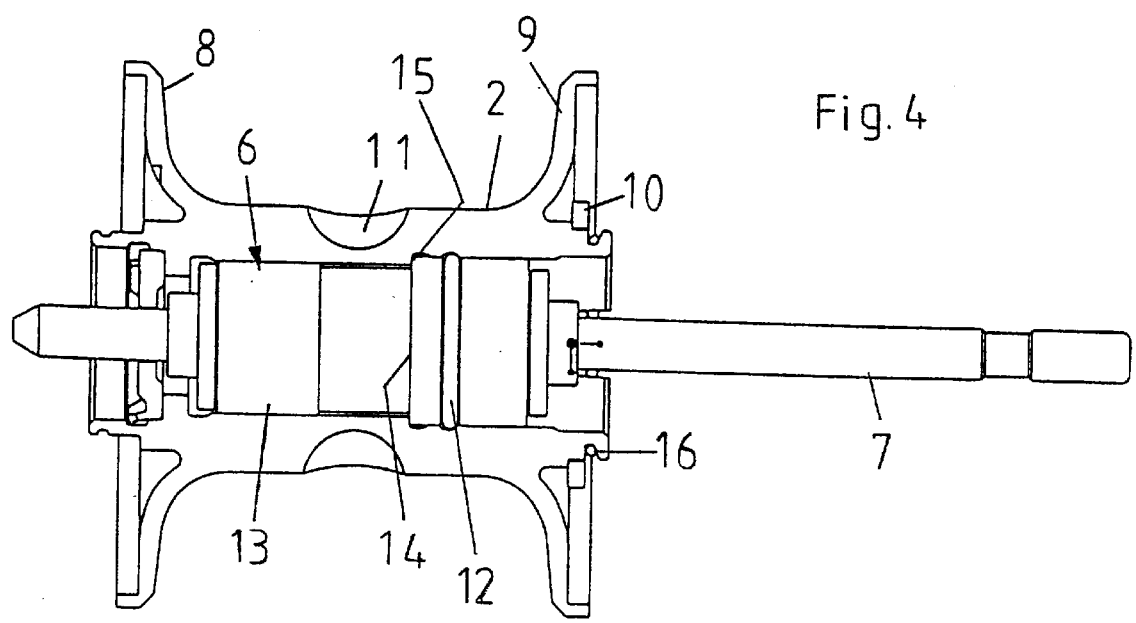

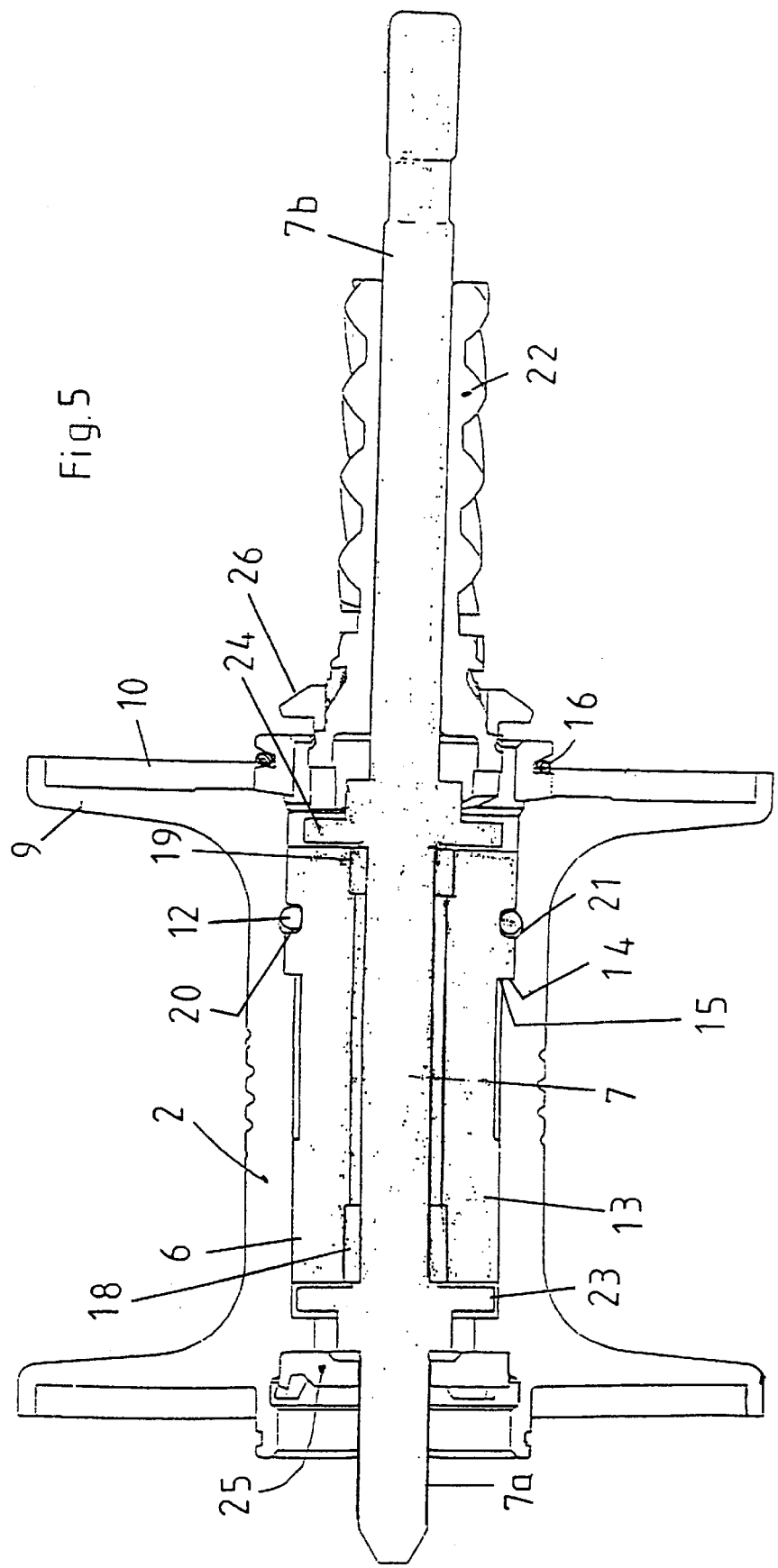

FISHING REEL

This application is based on and claims priority under 35 U.S.C. §119 with respect to Swedish Application No. 0100316-9 filed on Feb. 1, 2001, the entire content of which is incorporated herein by reference.

FIELD OF THE INVENTION

The present invention generally relates to a fishing reel. More particularly, the present invention pertains to a fishing reel of the type having a spool rotatably supported in a bearing arrangement on a spindle, which is provided between two reel gables. The fishing reel can be a bait caster reel, for example of the multiply type, but the invention is not limited to such a reel as it can also be applied on every type of fishing reel having a rotatable spool supported on a spindle.

BACKGROUND OF THE INVENTION

One factor for determining the quality of a fishing reel is the so-called free spool rotation time. This is defined as the time that a spool will continue to rotate after it has been subjected to a defined influence. The calculation of the free spool rotation time is accomplished by attaching the reel to a fixture with the spool arranged substantially horizontal. A line of 500 mm length attached to a 20 g lead weight is affixed to the spool via a tape. The line is wound up on the spool and the weight is then dropped. The time is measured from the moment the weight is dropped until the spool has stopped rotating.

It would be desirable to provide a fishing reel having an improved spindle unit. It would also be desirable to provide a fishing reel in which the time of free spool rotation is increased.

A need also exists for a fishing reel which permits the spool to be easily mounted and dismounted with a relatively few hand grips.

SUMMARY OF THE INVENTION

According to one aspect, a fishing reel includes a spool rotatably supported in a bearing arrangement on a spindle unit, with the spindle unit being a held-together unit incorporating an elongated spindle. A sleeve-formed bearing housing is supported on the spindle by the bearing arrangement comprised of at least at two spaced apart rolling bearings. Annular washers are provided on the spindle and form together with the bearing housing a small slot towards each end of the housing acting as a seal for shielding off the interior of the bearing housing from surroundings. The bearing housing has an exterior provided with at least one radially extending shoulder. The spool is sleeve-shaped, is provided with a radially projecting flange portion at each end of the spool, and has at least one internal projection adapted to engage the radially extending shoulder of the bearing housing to define an axial position of the spool in relation to the rolling bearings and to take up axial load in one direction. A resilient member is provided between the outer surface of the bearing housing and the inner surface of the spool for effecting play-free contact between the bearing housing and the spool and for effecting a pretension of the spindle unit against the radially extending shoulder of the bearing housing.

According to another aspect, a fishing reel includes a spindle, a bearing housing supported on the spindle by axially spaced apart rolling bearings, and a spool mounted on the bearing housing to rotate with respect to the spindle. A pair of spaced apart annular washers is provided on the spindle, with each of the washers forming in conjunction with at least the inner surface of the spool a slot functioning as a labyrinth seal which seals an interior of the bearing housing from a surrounding environment. An outwardly extending shoulder is also provided on the bearing housing. An inwardly extending projection on the spool is engageable with the outwardly extending shoulder on the bearing housing. A gable wall is provided at each axial end of the spool, and a resilient member is located between the bearing housing and the spool. The resilient member is positioned in a groove formed in at least one of the outer surface of the bearing housing and the inner surface of the spool.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

FIG. 2 is a planar cross-sectional view of the fishing reel shown in FIG.

FIG. 4 is a planar view, partly in cross-section, of the spool shown in FIG. 3 with its spindle unit.

FIG. 5 is a planar view similar to FIG. 4, showing a slightly modified spool with a spindle unit illustrated somewhat schematically in cross-section.

DETAILED DESCRIPTION OF THE INVENTION

Figure 1:
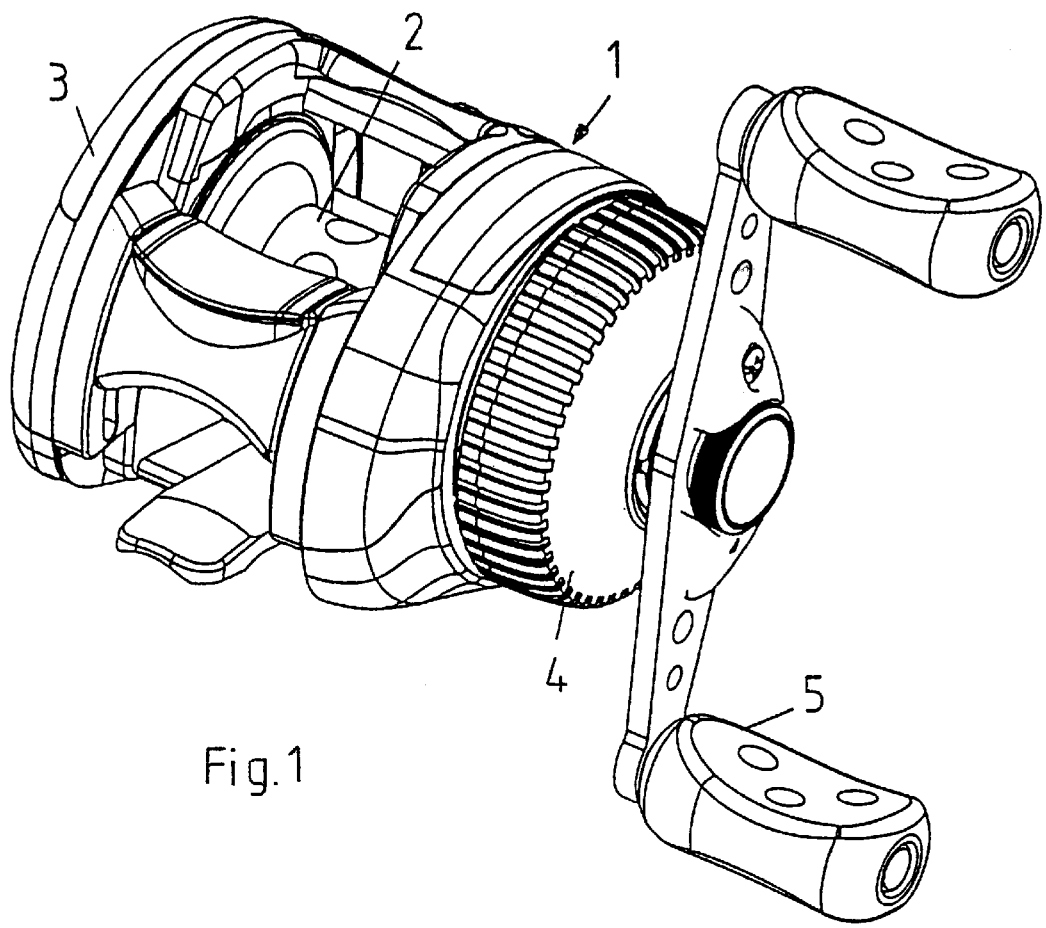
FIG. 1 is a perspective view of a fishing reel of the multiplying bait caster type according to the present invention.

As shown in FIG. 1, a fishing reel 1 of the bait caster type has a spool 2 rotatably supported on a spindle unit which in turn is supported in gables 3, 4 of the fishing reel, and having one end connected to a hand crank 5.

FIG. 2 illustrates, partly in cross-section, the interior of the fishing reel 1 shown in FIG. 1. As mentioned above, the spool 2 is supported by a spindle unit 6 which is supported in the gables 3, 4 of the reel on a spindle 7. The reel also incorporates a plurality of conventional design details such as a transmission for connecting the hand crank to the spindle unit and to the spool, a fastcast mechanism for disconnection of the spool, a braking mechanism, a line distributor, etc. These features are not described in detail here as they are known to persons in the art, and can be substituted by other arrangements.

Figure 3:
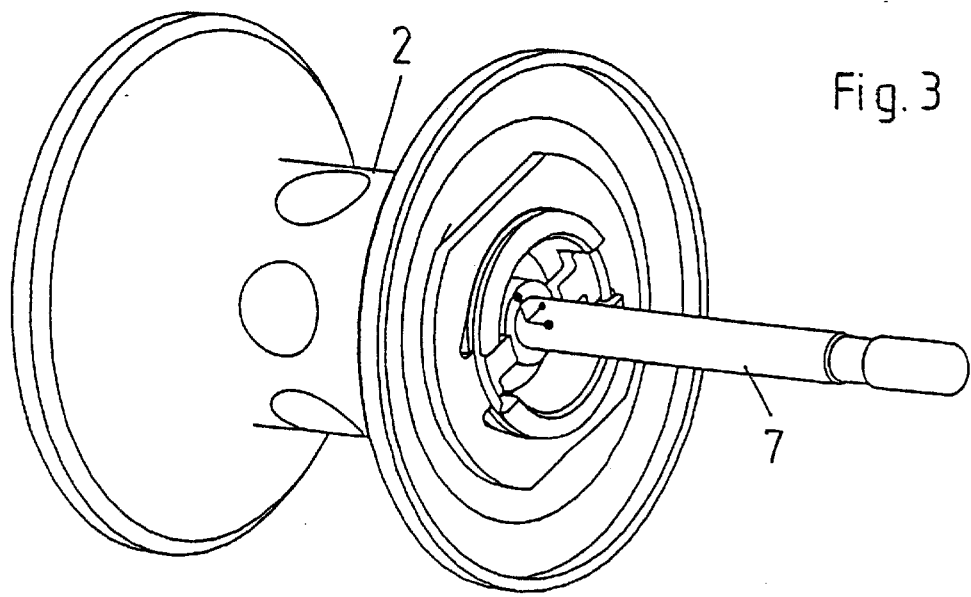
FIG. 3 is a perspective view of a spool with its spindle unit forming part of the fishing reel shown in FIGS. 1 and 2.

FIG. 3 shows the spool 2 connected to the spindle 7 of the spindle unit incorporated in the fishing reel. The spool 2 and the spindle 7 are further shown in the partial cross-section in FIG. 4. As can be seen, the spool 2 is substantially sleeve-formed and is provided with gable walls in the form of radially projecting flange portions 8, 9 provided at axially opposed ends of the spool 2. A driver disk or driving member 10 for interconnecting the spool with the crank handle is attached to the outer axial side of one gable wall 9. This driver disk 10 is preferably a steel washer. The outer circumferential surface of the spool 2 in this embodiment is provided with part-spherical recesses 11 which are provided for reducing the weight of the spool.

The spindle unit 6 incorporates a tubular or sleeve-formed bearing housing 13 supported on the spindle 7 via bearings which are not visible in FIG. 4. A radially extending shoulder 14 is provided on the outer circumferential surface of the bearing housing 13. This shoulder 14 is adapted to abut and be engaged by an internal projection 15 at the inner circumferential surface of the spool 2. In the illustrated embodiment, this projection 15 is formed as a radially extending shoulder. A resilient member 12 is provided between the outer circumferential surface of the bearing housing 13 and the inner circumferential surface of the spool 2. In the illustrated embodiment, the resilient member 12 is in the form of an O-ring which is positioned under a certain compression and preferably inserted in a groove in the inner circumferential surface of the spool 2 and another groove in the outer circumferential surface of the bearing housing 13. The spool 2 is further provided with a circumferential groove provided at one axial side of the spool 2 that receives a locking member 16 in the form of a snap-in locking wire for arresting the clutch washer.

FIG. 5 illustrates in an enlarged manner a slightly modified version of the spool 2, the spindle unit 6 and its spindle 7. Here the bearing housing 13 is shown in a schematic cross-section. As can be seen, the bearing housing 13 is rotatably supported by two rolling bearings 18, 19. The rolling bearings 18, 19 are situated at a maximum axial distance from each other in the bearing housing 13, thus giving the bearing housing 13 and the spool 2 mounted thereon a relatively smooth and generally vibration-free operation.

The bearing housing 13 possesses an external shoulder 14 while the spool 2 is provided with an internal projection or shoulder 15. The external shoulder 14 of the bearing housing 13 and the internal shoulder or projection 15 of the spool 2 are intended to engage each other in abutting relation when the spool 2 is mounted on the bearing housing 13 in a manner similar to that described above. It is thus possible to ascertain or ensure that the spool 2 is positioned substantially symmetrically in relation to the two bearings, whereby also the spool 2 will exhibit relatively smooth and generally trouble-free operation.

A resilient member 12 is provided between the surfaces of the spool 2 and the bearing housing 13 that face each other when the spool 2 is mounted on the bearing housing 13. The resilient member 12 is fitted under compression to give a force inhibiting or preventing axial movement of the spool 2 on the bearing housing 13. This resilient member 12 is preferably an O-ring which is fitted under strain in a groove 20 in the external circumferential surface of the bearing housing. The resilient member 12 projects outwardly from the outer circumferential surface of the bearing housing 13 and is preferably received in a corresponding groove 21 in the interior circumferential surface of the spool 2 in such a manner that the resilient member 12 is compressed in its mounted position, thus inhibiting or preventing axial movement between the spool 2 and the bearing housing 13.

The spindle 7 at one of its ends terminates in a short shaft journal 7a outside the bearing housing. This shaft journal 7a is supported in one of the reel gables (i.e., the reel gable 3 shown in FIG. 2). The opposite end of the spindle 7 is provided with a spindle part 7b which projects out from the bearing housing and supports a drive gear 22, preferably made from brass, and to which is connected the driver disc 10 mentioned above. The spindle 7 is further provided with end washers 23, 24, each positioned at one end face of the bearing housing 13. These washers 23, 24 together with the interior circumferential surface of the spool 2 and the associated end gable of the bearing housing 13 form a narrow slot acting as a labyrinth seal that seals the interior of the bearing housing from the surrounding environment, and even allowing under rotation of the components a certain pumping effect in a direction out from the bearing housing. Outside the end washer 23 at the shaft journal 7a end of the spindle is positioned a further sealing cover 25 preferably made from plastic material.

With the above-described construction, the spindle unit 6 is made as a held-together unit incorporating the spindle 7 and the bearing housing 13 with the rolling bearings 18, 19. This unit can be manufactured as a closed unit ready for mounting at the plant where the fishing reel is manufactured. This spindle unit can be locked in position by way of a nut 26 and the earlier described locking member 16 in the form of a snap-in locking wire. It also is easy to remove the spindle unit for maintenance or exchange by just loosening the nut 26 and removing the locking ring 16, whereupon the spindle unit 6 can be pulled out axially.

In the embodiments described above, the bearing housing and the spool can be made of aluminum.

It is to be understood that the invention is not limited to the particular embodiments shown and described with reference to the accompanying drawing figures, as modifications and variants are possible. For example, the invention is not limited to use in multiplying bait casters as illustrated, but can also be applied to other types of fishing reels.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A fishing reel comprising:

a spool rotatably supported in a bearing arrangement on a spindle unit, the spindle unit being a held-together unit incorporating an elongated spindle;

a sleeve-formed bearing housing supported on the spindle by the bearing arrangement comprised of at least at two spaced apart rolling bearings;

annular washers provided on the spindle and forming with the bearing housing a small slot towards each end of the housing acting as a seal for shielding off an interior of the bearing housing from surroundings;

the bearing housing having an exterior provided with at least one radially extending shoulder;

the spool being sleeve-shaped and having an inner surface, the spool being provided with a radially projecting flange portion at each end of the spool and at least one internal projection adapted to engage the radially extending shoulder of the bearing housing to define an axial position of the spool in relation to the rolling bearings and to take up axial load in one direction; and a resilient member provided between an outer surface of the bearing housing and the inner surface of the spool for effecting play-free contact between the bearing housing and the spool and for effecting a pretension of the spindle unit against the radially extending shoulder of the bearing housing.

2. The fishing reel according to claim 1, wherein the resilient member is an O-ring positioned in a groove in an outer surface of the bearing housing, the O-ring projecting into a groove provided in the inner surface of the spool.

3. The fishing reel according to claim 2, wherein the bearing housing and the spool are both made of aluminum.

4. The fishing reel according to claim 3, wherein the spindle has one portion extending axially outside the bearing housing and supporting a drive gear, the drive gear being connected to one of the radially projecting flange portions of the spool via a driving member.

5. The fishing reel according to claim 4, wherein the spindle unit is a held-together unit incorporating the spindle, the rolling bearings and the bearing housing.

6. The fishing reel according to claim 5, including an end sealing cover positioned adjacent one end of the bearing housing between the spindle and the spool at a position axially outside the seal.

7. The fishing reel according to claim 1, wherein the bearing housing and the spool are both made of aluminum.

8. The fishing reel according to claim 1, wherein the spindle has one portion extending axially outside the bearing housing and supporting a drive gear, the drive gear being connected to one of the radially projecting flange portions of the spool via a driving member.

9. The fishing reel according to claim 1, wherein the spindle unit is a held-together unit incorporating the spindle, the rolling bearings and the bearing housing.

10. The fishing reel according to claim 1, including an end sealing cover positioned adjacent one end of the bearing housing between the spindle and the spool at a position axially outside the seal.

11. A fishing reel comprising:

a spindle;

a bearing housing supported on the spindle by axially spaced apart rolling bearings, the bearing housing having an outer surface;

a spool mounted on the bearing housing to rotate with respect to the spindle, the spool having an inner surface;

a pair of spaced apart annular washers provided on the spindle, each of the washers forming in conjunction with at least the inner surface of the spool a slot functioning as a labyrinth seal which seals an interior of the bearing housing from a surrounding environment;

an outwardly extending shoulder provided on the bearing housing;

an inwardly extending projection on the spool that is engageable with the outwardly extending shoulder on the bearing housing;

a gable wall provided at each axial end of the spool; and a resilient member located between the bearing housing and the spool, the resilient member being positioned in a groove formed in at least one of the outer surface of the bearing housing and the inner surface of the spool.

12. The fishing reel according to claim 11, wherein the bearing housing and the spool are both made of aluminum.

13. The fishing reel according to claim 12, including a driver disc connecting the drive gear to one of the gable walls.

14. The fishing reel according to claim 11, wherein one end of the spindle projects axially outside the bearing housing, and including a drive gear supported on the one end of the spindle.

15. The fishing reel according to claim 11, wherein the spindle unit is a held-together unit incorporating the spindle, the rolling bearings and the bearing housing.

16. The fishing reel according to claim 11, including an end sealing cover positioned adjacent one end of the bearing housing between the spindle and the spool at a position axially outside the seal.

17. The fishing reel according to claim 11, including a groove formed in an outer surface of the spool adjacent one of the gable walls, and a locking member positioned in the groove.

18. The fishing reel according to claim 11, wherein the resilient member is positioned in a groove in the outer surface of the bearing housing and in a groove in the inner surface of the spool.

* * * * *